US012594766B2

(12) United States Patent
Katayama et al.

(10) Patent No.: US 12,594,766 B2
(45) Date of Patent: Apr. 7, 2026

(54) PRINTING APPARATUS

(71) Applicant: CANON KABUSHIKI KAISHA, Tokyo (JP)

(72) Inventors: Kaori Katayama, Tokyo (JP); Yasunori Saito, Kanagawa (JP); Noriko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 18/448,785

(22) Filed: Aug. 11, 2023

(65) Prior Publication Data

US 2023/0391094 A1 Dec. 7, 2023

Related U.S. Application Data

(63) Continuation of application No. PCT/JP2022/005204, filed on Feb. 9, 2022.

(30) Foreign Application Priority Data

Feb. 12, 2021 (JP) ................................ 2021-021067

(51) Int. Cl.
*B41J 2/175* (2006.01)

(52) U.S. Cl.
CPC ............ *B41J 2/175* (2013.01); *B41J 2202/12* (2013.01)

(58) Field of Classification Search
CPC .... B41J 2/175; B41J 2202/12; B41J 2/17509; B41J 2/1752; B41J 2/01; B41J 2/17523; B41J 2/17553
USPC ........................................................... 347/85
See application file for complete search history.

(56) References Cited

U.S. PATENT DOCUMENTS

| | | | | |
|---|---|---|---|---|
| 2002/0071002 | A1 | 6/2002 | Kawamura | |
| 2004/0246284 | A1* | 12/2004 | Murai | B41J 19/202 400/55 |
| 2009/0169249 | A1 | 7/2009 | Watanabe | |
| 2011/0148983 | A1 | 6/2011 | Sekino | |
| 2012/0268534 | A1 | 10/2012 | Gômez | |

FOREIGN PATENT DOCUMENTS

| | | | |
|---|---|---|---|
| CN | 102085763 | A | 6/2011 |
| CN | 102381039 | A | 3/2012 |
| JP | H07-076100 | A | 3/1995 |
| JP | 2005-313654 | A | 11/2005 |

(Continued)

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

A printing apparatus includes a carriage on which a printhead is mounted, a liquid supply portion coupled to a liquid inflow portion of the printhead and, a first operating member rotatably attached to the carriage and configured to shift the liquid inflow portion and the liquid supply portion to a coupled state by being operated in a first direction and to shift the liquid inflow portion and the liquid supply portion to a decoupled state by being operated in a second direction; and a lock member coupled to the first operating member and configured to switch to a lock state to restrict the first operating member from shifting from the coupled state to the decoupled state and to a disengaged state to permit the first operating member to shift from the coupled state to the decoupled state.

9 Claims, 10 Drawing Sheets

(56) References Cited

FOREIGN PATENT DOCUMENTS

| | | | |
|---|---|---|---|
| JP | 2007-112130 | A | 5/2007 |
| JP | 2009-157137 | A | 7/2009 |
| JP | 2011037058 | A | 2/2011 |
| JP | 2012-051146 | A | 3/2012 |

* cited by examiner

PRINTING APPARATUS

CROSS-REFERENCE TO RELATED APPLICATIONS

This application is a Continuation of International Patent Application No. PCT/JP2022/005204, filed Feb. 9, 2022, which claims the benefit of Japanese Patent Application No. 2021-021067, filed Feb. 12, 2021, both of which are hereby incorporated by reference herein in their entirety.

BACKGROUND OF THE INVENTION

Field of the Invention

The present invention relates to a printing apparatus.

Background Art

There has been known an inkjet printing apparatus in which a printhead that discharges ink is coupled to an ink tank that stores ink to be supplied to the printhead through a tube. In this arrangement, when it is necessary to replace the printhead, the joint portion between the printhead and the tube needs to be disjoined once and then needs to be connected again upon the replacement of the printhead. Patent literature 1 discloses an arrangement in which the joint portion between a printhead and a tube is operated with a joint lever.

CITATION LIST

Patent Literature

PTL 1: Japanese Patent Laid-Open No. 2012-51146

Conventionally, there is a problem that while the printhead is connected to the joint portion of the tube, the joint lever moves due to the reaction of the elastomeric force of the joint, and the insertion amount of the joint portion changes. When the insertion amount of the joint portion changes, leak occurs in the joint portion. As a result, ink is not normally supplied from the ink tank to the printhead, and hence an ink discharge failure occurs in the printhead.

In order to cope with this problem, the technique disclosed in PTL 1 is provided with a lock arrangement that can hold the joint lever in the coupled state to reduce the variation in the insertion amount of the joint portion. In this case, the lock arrangement needs to be provided with a spring member for maintaining the holding force. This sometimes increases the apparatus size because of the necessity to secure a spring arrangement space.

SUMMARY OF THE INVENTION

The present invention has been made in consideration of the above problem and provides a printing apparatus that can reliably connect a printhead to a liquid supply portion and implement stable discharging from the printhead.

According to the present invention, there is provided a printing apparatus comprising: a carriage on which a printhead configured to discharge a liquid is mounted; a liquid supply portion coupled to a liquid inflow portion of the printhead and configured to supply a liquid to the printhead; a first operating member rotatably attached to the carriage and configured to shift the liquid inflow portion and the liquid supply portion to a coupled state in which the liquid inflow portion and the liquid supply portion are coupled by being operated in a first direction and to shift the liquid inflow portion and the liquid supply portion to a decoupled state in which the liquid inflow portion and the liquid supply portion are separated from each other by being operated in a second direction; and a lock member formed by a member different from the first operating member and coupled to the first operating member and configured to switch to a lock state in which the lock member is engaged with an engaging portion of the carriage to restrict the first operating member from shifting from the coupled state to the decoupled state and to a disengaged state in which the lock member is separated from the engaging portion to permit the first operating member to shift from the coupled state to the decoupled state.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1A:
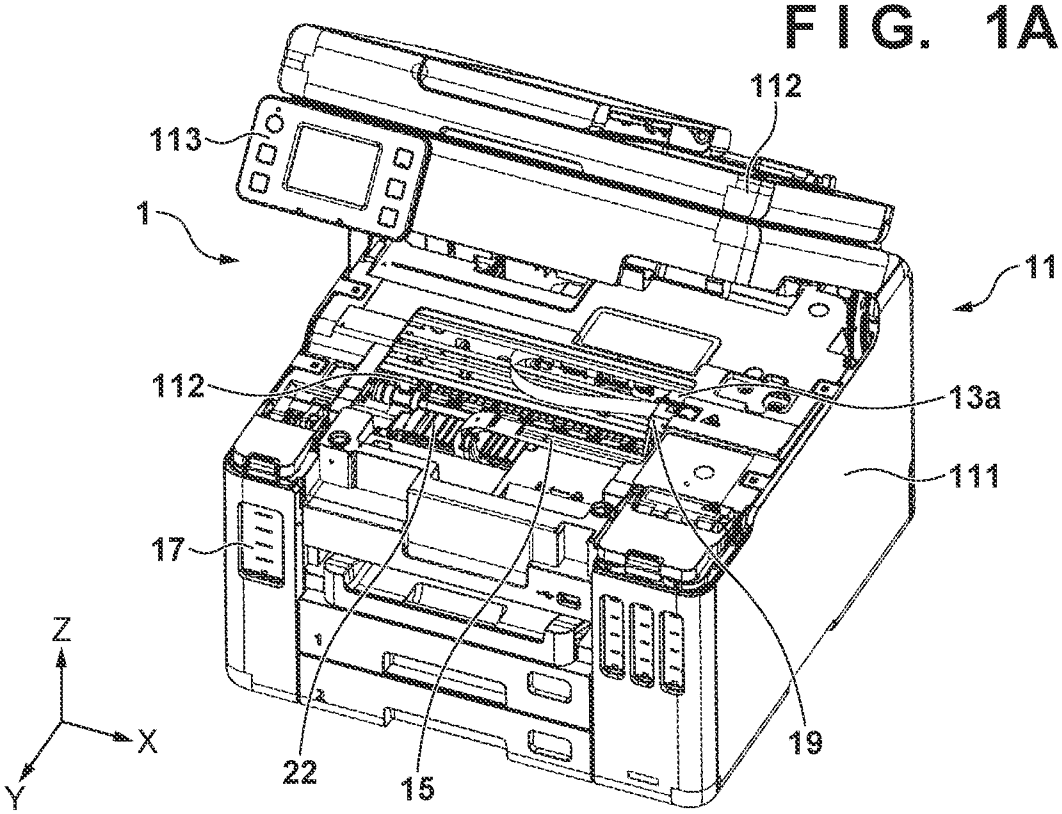
FIG. 1A is a perspective view showing an inkjet printing apparatus according to the first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following description of an embodiment, the term "printing" (to be also sometimes referred to as print or printing) not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

In addition, the term "print medium" not only includes a paper sheet used in common printing apparatuses, but also broadly includes conveyable media, such as cloth, a plastic film, a metal plate, glass, ceramics, wood, leather, and the like.

Furthermore, the term "ink" (to be also referred to as a "liquid" hereinafter) should be extensively interpreted in a similar manner to the definition of "printing (print)" described above, and includes a liquid which, when applied onto a print medium, can form images, figures, patterns, and the like, can process the print medium, or can process ink (for example, solidify or insolubilize a coloring material contained in ink applied to the print medium).

First Embodiment

<Schematic Arrangement of Inkjet Printing Apparatus>

Figure 1B:
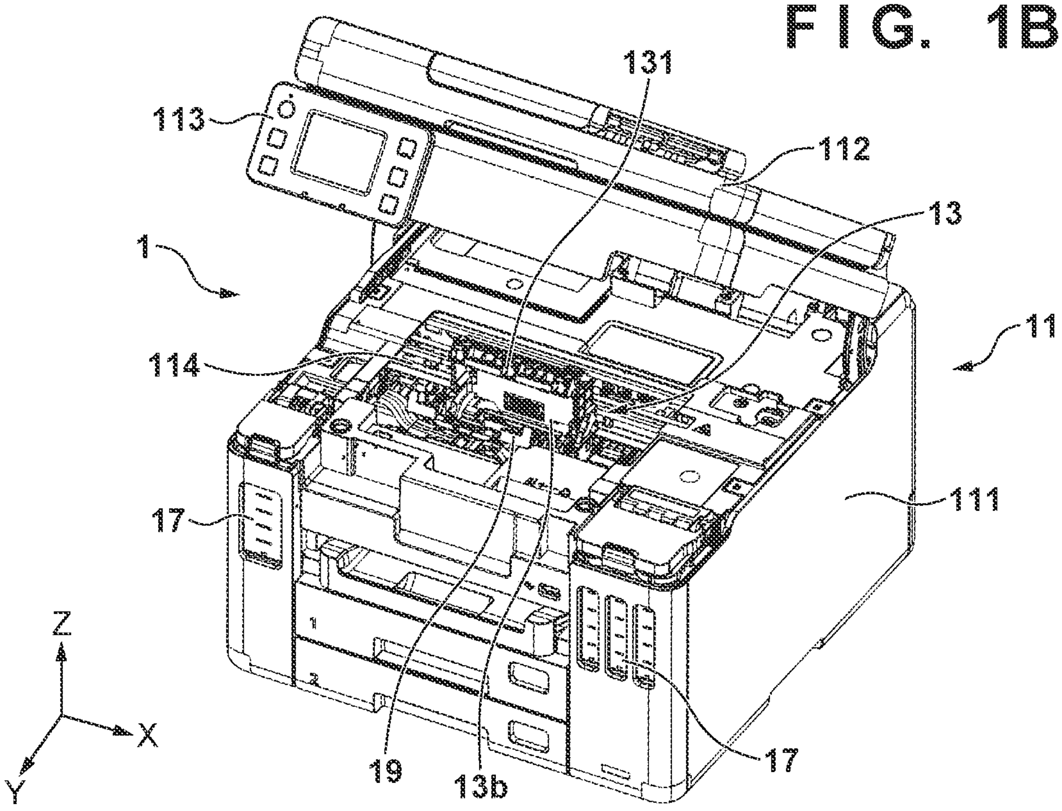
FIG. 1B is a perspective view showing the inkjet printing apparatus according to the first embodiment of the present invention.

FIGS. 1A and 1B are perspective views showing an inkjet printing apparatus 1 (to be referred to as the printing apparatus 1 hereinafter) as an example of a liquid discharging apparatus according to the first embodiment of the present invention. FIG. 1A shows a state in which a carriage 13 (to be described later) is located at a standby position 13*a*. FIG. 1B shows a state in which the carriage 13 has moved to a printhead replacement position 13*b*.

Referring to FIGS. 1A and 1B, the printing apparatus 1 includes a printhead 14 (see FIG. 3) that discharges ink to a print medium and an ink tank 17 as a storage body that stores ink to be supplied to the printhead 14. The printing apparatus 1 includes a supply tube 15 forming an ink supply path for supplying ink from the ink tank 17 to the printhead 14. The printing apparatus 1 also includes the carriage 13 on which the printhead 14 is detachably mounted and which reciprocally moves.

The printing apparatus 1 includes a plurality of rollers (conveyance means) that feed a sheet-like print medium and convey the print medium in a conveying direction orthogonal to the moving direction (main scanning direction) of the carriage 13 (the printhead 14) by using the rollers. A platen 22 is provided below the moving range of the printhead 14 so as to face the printhead 14. The platen 22 supports the lower surface of a print medium on which printing is performed by the printhead 14.

A housing 11 is provided to cover these internal components. The housing 11 includes a main body 111 having an opening portion 114 and a cover member 112 covering the opening portion 114. The cover member 112 is openably supported on the main body 111. The cover member 112 is provided with a panel portion 113 for operating the printing apparatus 1. In order to prevent ink leakage, the carriage 13 stays at the standby position 13*a* (see FIG. 1A) when the user opens the cover member 112. When the user selects the head replacement mode with the panel portion 113, the carriage 13 is moved to the head replacement position 13*b* (see FIG. 1B) while the ink supply path is closed to prevent ink leakage by a channel closing mechanism provided in the ink supply path.

FIG. 1B shows the printing apparatus 1 in a state in which the printhead 14 is removed after the carriage 13 is moved to the head replacement position 13*b*. The carriage 13 includes a carriage base (base portion) 134 (see FIGS. 2A to 2D) on which the printhead is to be mounted and a head set lever (second operating member) 131 rotatably and axially supported by the carriage 13. A joint portion 18 (see FIGS. 2A to 2D) configured to be removably inserted in the printhead 14 is connected to the supply tube 15. The joint portion 18 is actually inserted and removed with a joint lever (first operating member) 19. When replacing the printhead 14, the user removes the joint portion 18 from the printhead 14 with the joint lever 19 and then removes the printhead 14 upon pivoting of the head set lever 131. Thereafter, the user attaches again the printhead 14 to be mounted.

Figure 2A:
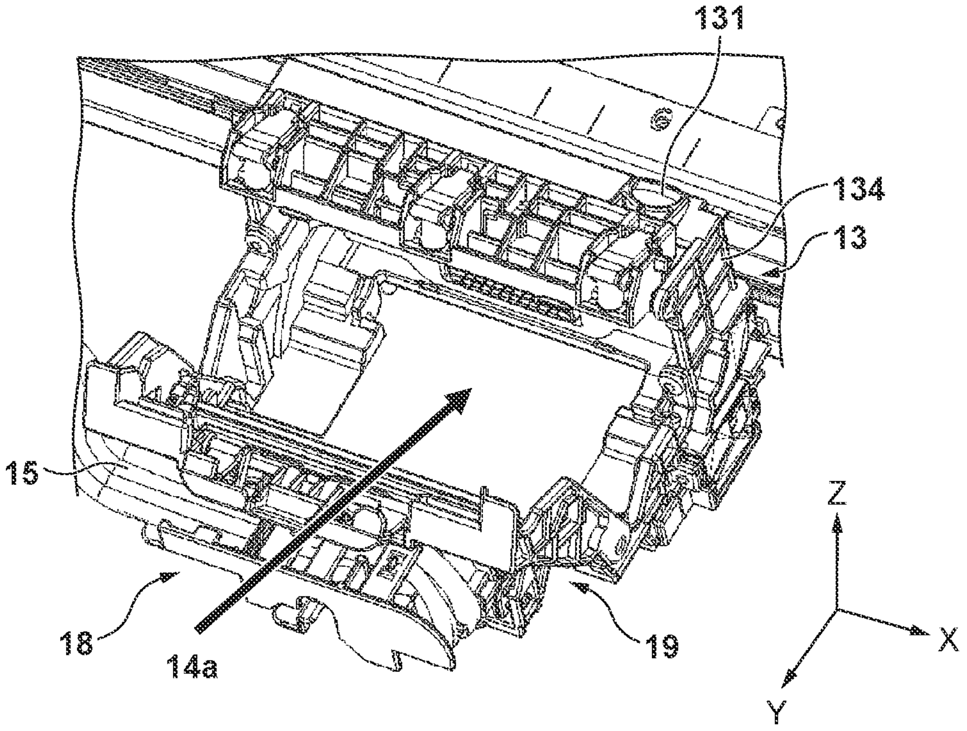
FIG. 2A is a perspective view showing a mounting procedure for a printhead.
Figure 2B:
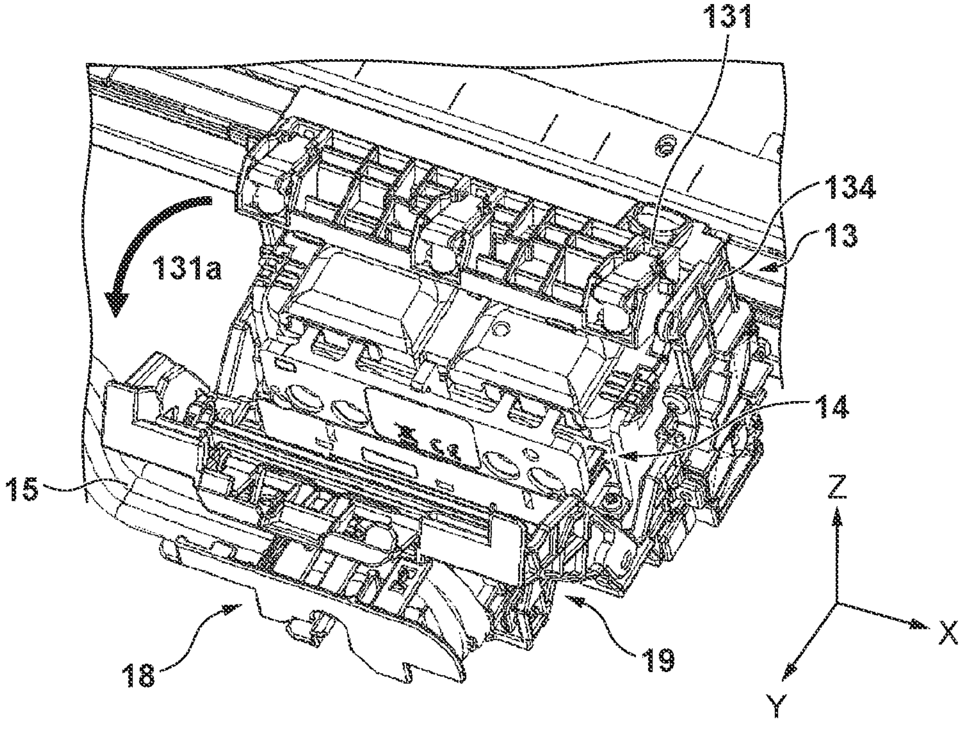
FIG. 2B is a perspective view showing the mounting procedure for the printhead.
Figure 2C:
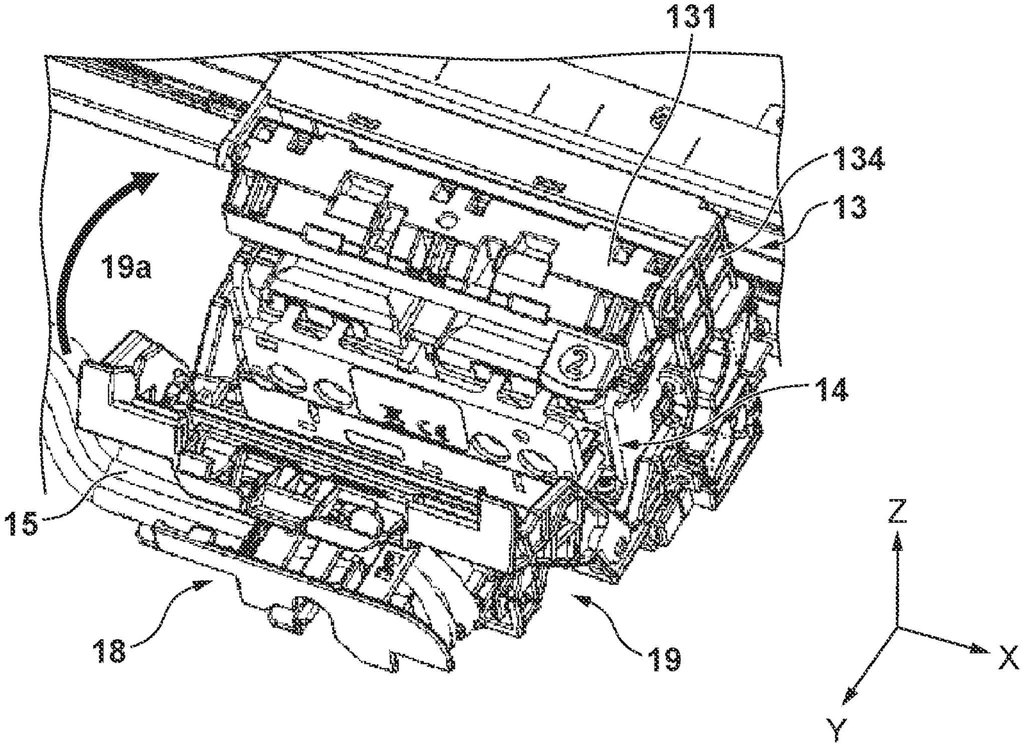
FIG. 2C is a perspective view showing the mounting procedure for the printhead.
Figure 2D:
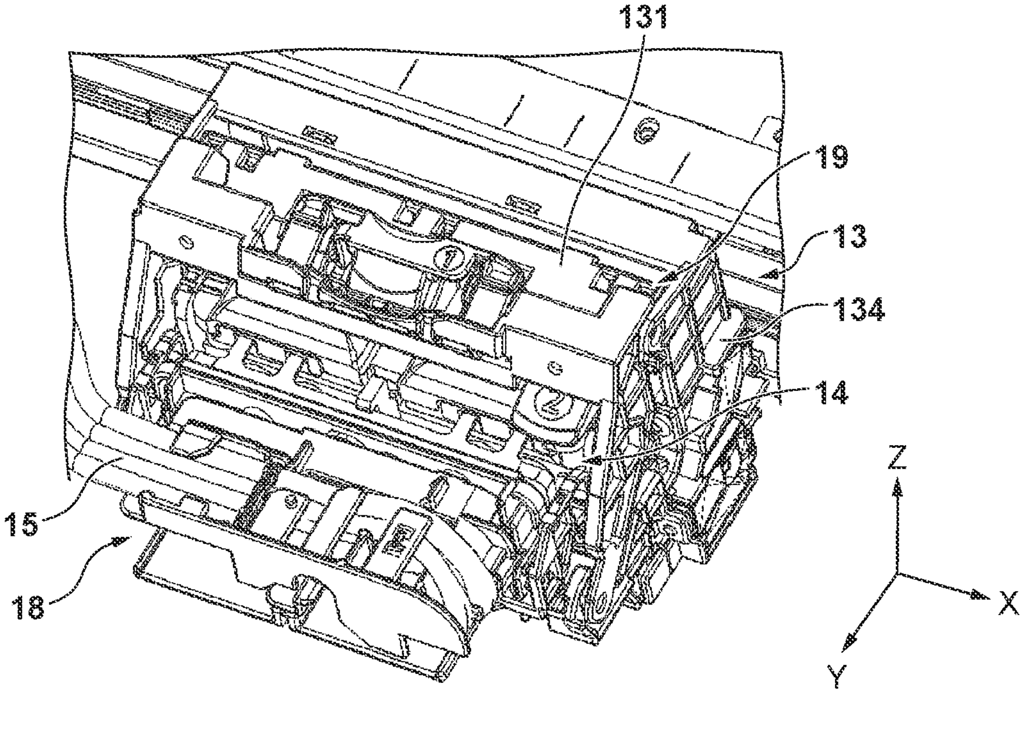
FIG. 2D is a perspective view showing the mounting procedure for the printhead.

FIGS. 2A to 2D are perspective views showing a mounting procedure for the printhead 14. FIG. 2A shows the carriage 13 while the printhead 14 is in a removed state. In this case, both the head set lever 131 and the joint lever 19 are in open states. When the printhead 14 is inserted from the front in the direction indicated by an arrow 14*a*, the printhead 14 is moved to a position where it can be mounted on the carriage 13. FIG. 2B shows the carriage 13 after the printhead 14 is inserted. At this time, the printhead 14 is not fixed yet. Thereafter, the head set lever 131 is made to pivot in the direction indicated by an arrow 131*a* to fix the printhead 14 to the carriage 13 (FIG. 2C). Thereafter, the joint lever 19 is made to pivot in the direction indicated by an arrow 19*a* to connect the printhead 14 to the joint portion 18 (FIG. 2D).

Figure 3:
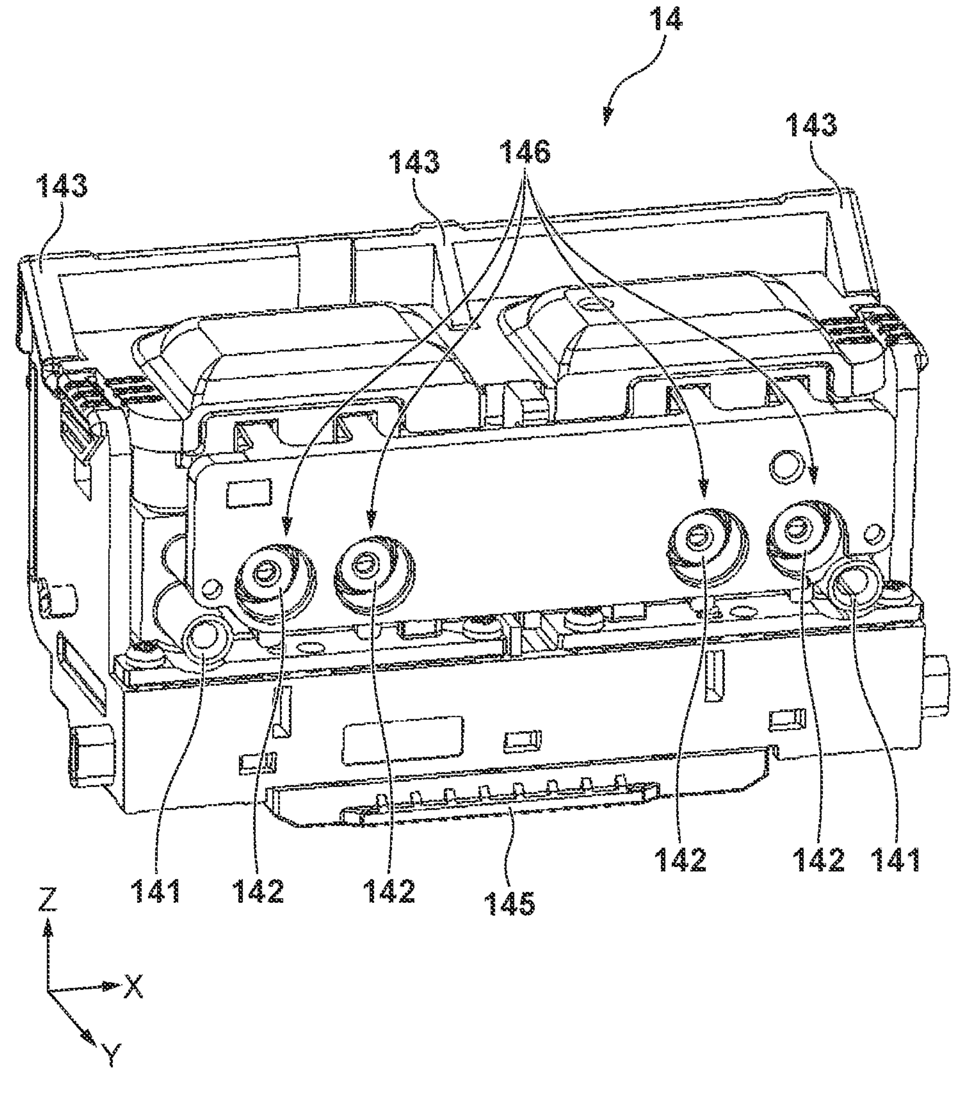
FIG. 3 is a perspective view showing the printhead.

FIG. 3 is a perspective view of the printhead 14. The printhead 14 performs printing by discharging ink from a discharging portion 145. The printhead 14 is fixed to the carriage 13 by pressing head slopes 143 with the head set lever 131 and bringing the printhead 14 into contact with the positioning face of the carriage 13. Joint rubber members 142 as elastic members are respectively attached to four ink inflow portions (liquid inflow portions) 146 of the printhead 14. The number of ink inflow portions 146 corresponds to the types of inks that can be discharged from the printhead 14. The joint rubber members 142 accept joint needles 182 (see FIG. 4) of the joint portion 18 and seal the couplings (coupled states) between the ink inflow portions 146 and the joint needles 182. The printhead 14 is positioned to the joint portion 18 with head positioning holes 141.

According to the above description, the joint rubber members 142 are arranged on the ink inflow portions 146 of the printhead 14. However, the joint rubber members may be arranged on the joint needle 182 side. Alternatively, the joint rubber members may be arranged on both the ink inflow portion 146 side and the joint needle 182 side. That is, the joint rubber members may be arranged at least on the ink inflow portions 146 of the printhead 14 or the coupling portions of the joint needles 182.

Figure 4:
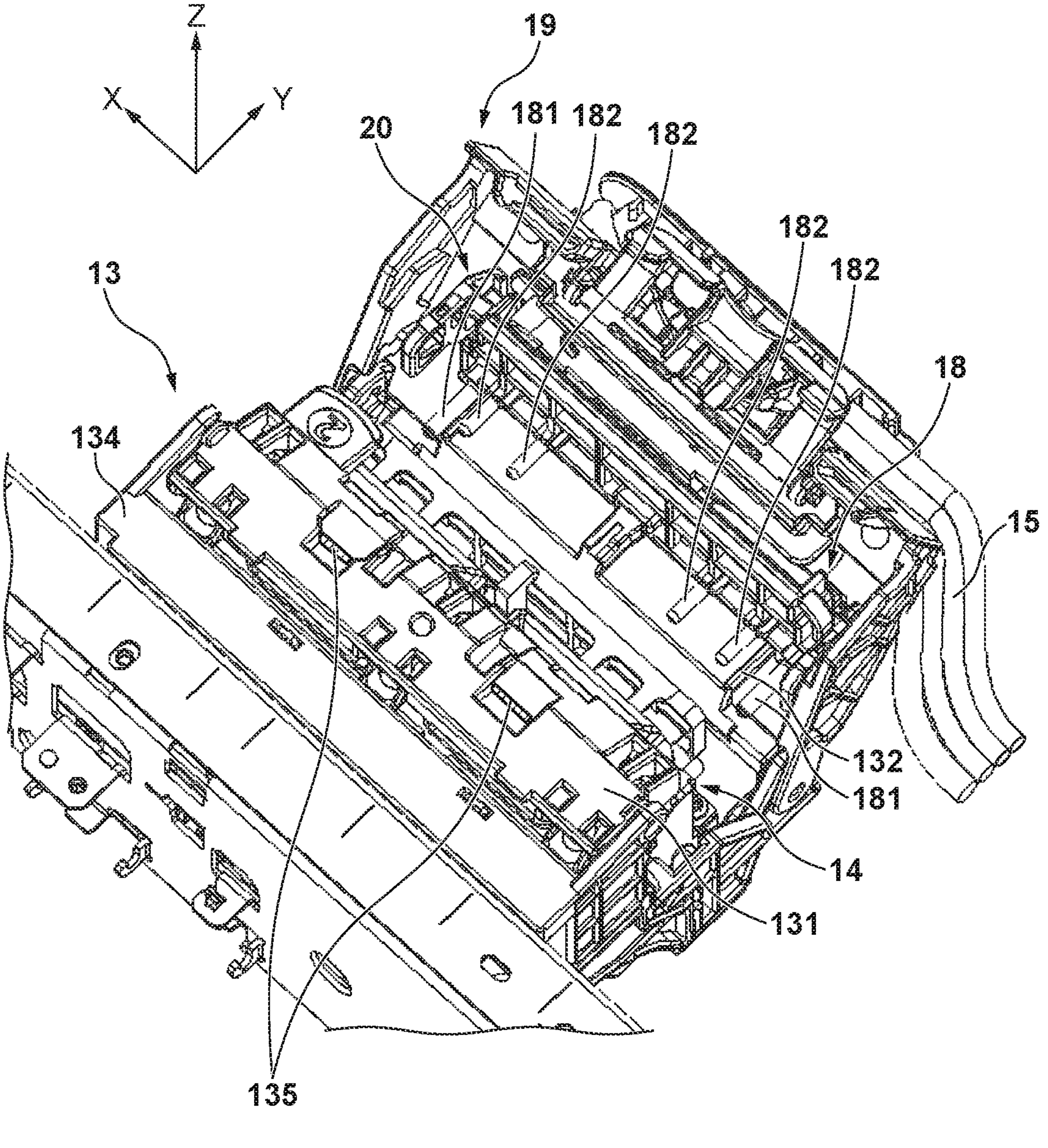
FIG. 4 is a perspective view showing a detailed arrangement of the joint portion of a carriage.

FIG. 4 is a perspective view showing the detailed arrangement of the joint portion 18. The joint portion 18 supplies the ink passing through the supply tubes 15 to the printhead 14 through the joint needles (liquid supply portions) 182. The joint portion 18 includes joint positioning pins 181. When the joint positioning pins 181 are inserted into the head positioning holes 141, the joint needles 182 are aligned with the joint rubber members 142. In this case, the carriage 13 is provided with a joint link 20 that serves to insert and remove the joint portion 18 with respect to the printhead 14 upon the pivoting operation of the joint lever 19. The carriage 13 is provided with a guide rail 132 that supports the joint link 20 in the inserting/removing direction of the joint portion 18. The guide rail 132 is arranged almost parallel to the inserting/removing direction of the joint portion 18.

Figure 5A:
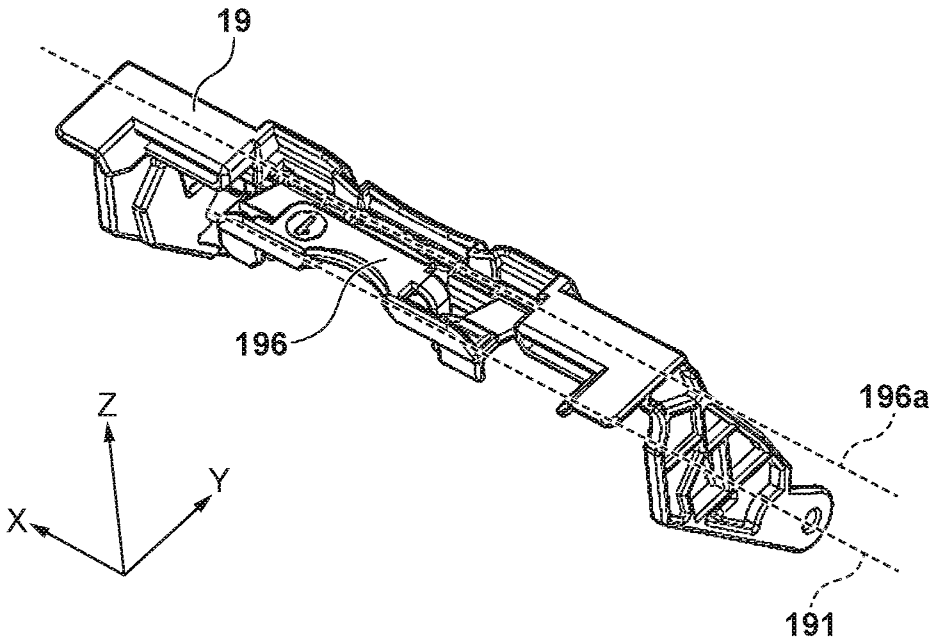
FIG. 5A is a view showing a head set lever and a joint lever.
Figure 5B:
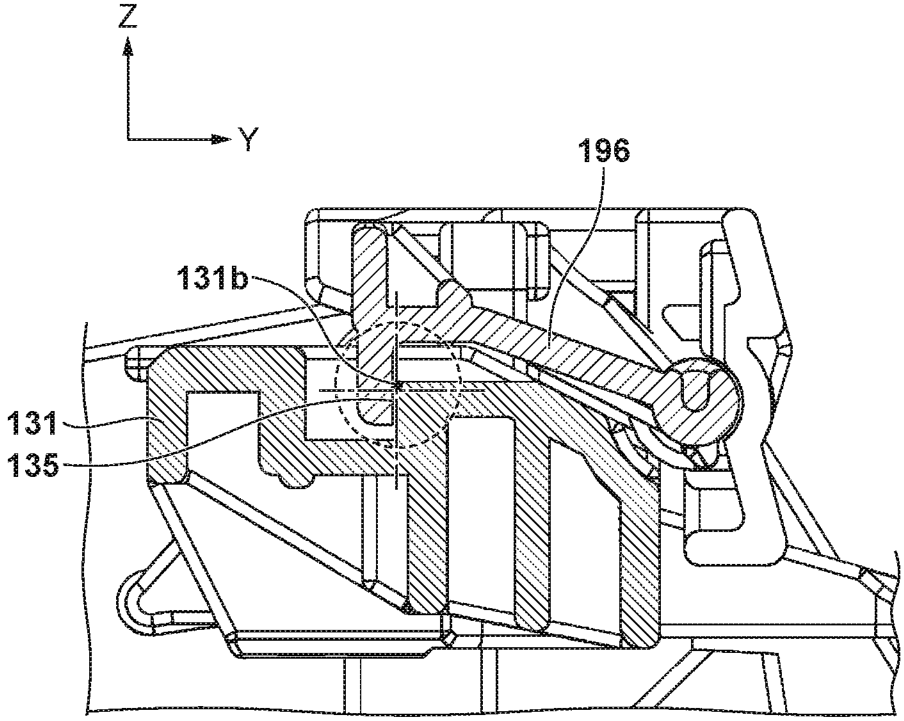
FIG. 5B is a view showing the head set lever and the joint lever.

FIG. 5A is a perspective view showing the arrangement of the joint lever 19. FIG. 5B is a side sectional view showing a state in which the head set lever 131 is engaged with the joint lever 19.

Referring to FIG. 5A, the joint lever 19 is attached to the carriage 13 so as to be rotatable about a joint lever rotation center 191. A lock member 196 is attached to the joint lever 19 so as to be rotatable about a central rotation axis 196*a*. Engaging the lock member 196 with an engaging face 135 of the head set lever 131 can fix the joint lever 19 to the printhead 14 (FIG. 5B). In this case, the lock member 196 is engaged with the head set lever 131. However, the operation of the joint lever 19 may be restricted by directly engaging the lock member 196 with the carriage 13.

Figure 6A:
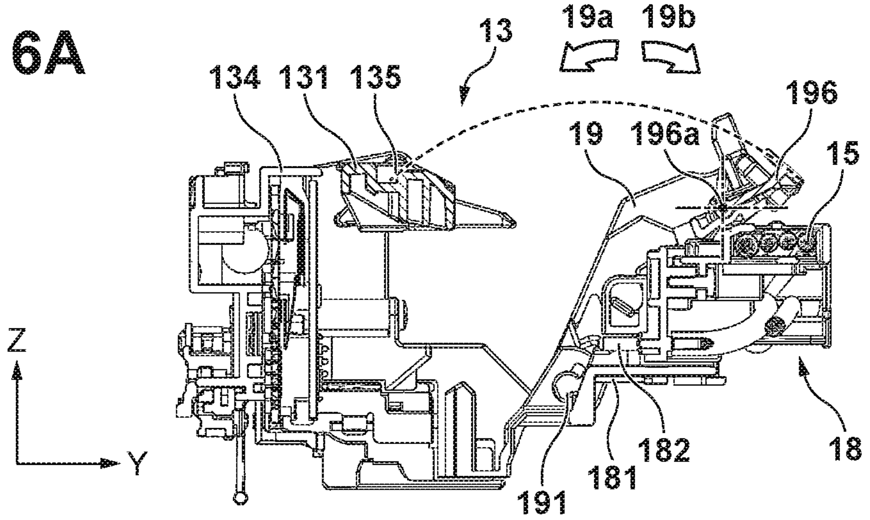
FIG. 6A is a view showing the operation of the joint lever when the joint portion is inserted into the printhead.
Figure 6B:
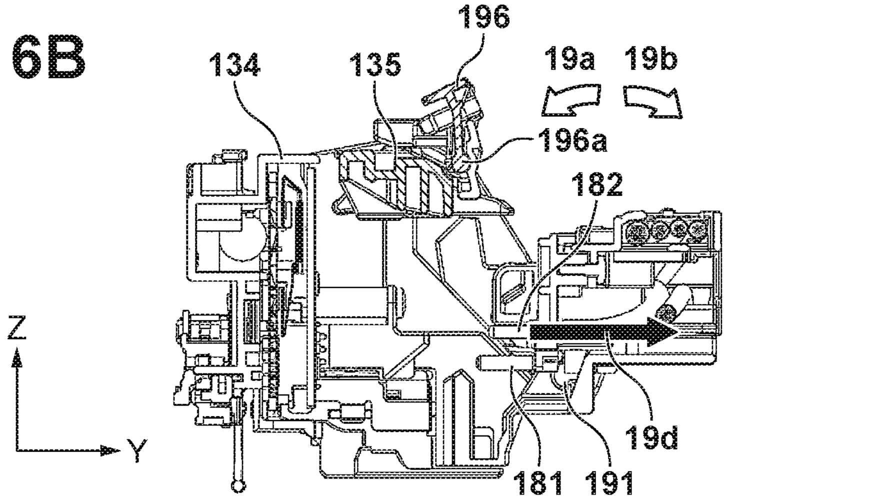
FIG. 6B is a view showing the operation of the joint lever when the joint portion is inserted into the printhead.
Figure 6C:
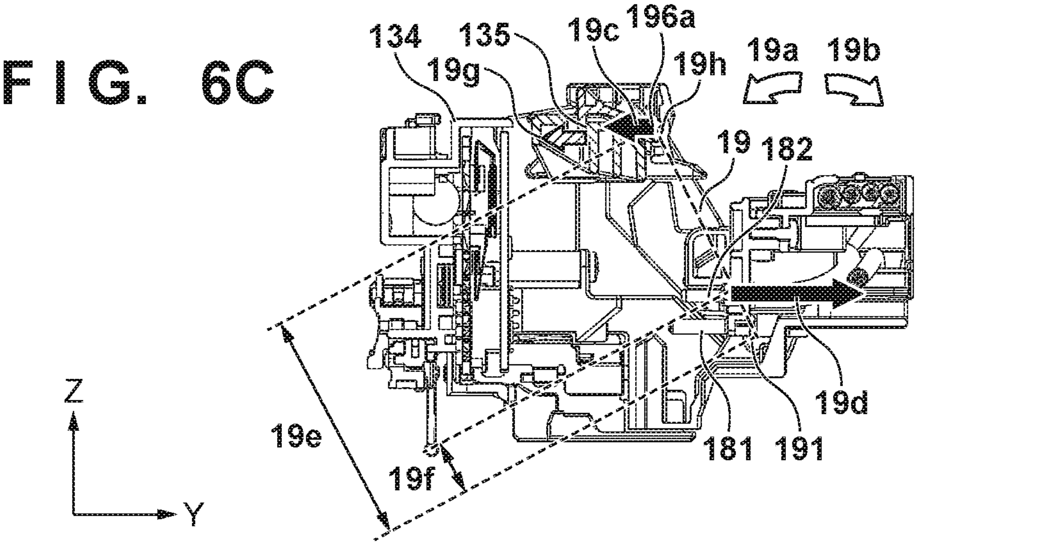
FIG. 6C is a view showing the operation of the joint lever when the joint portion is inserted into the printhead.

FIGS. 6A to 6C are views showing the operation of the joint lever 19 in a case in which the joint portion 18 is inserted into the printhead 14.

FIG. 6A is a sectional view (the printhead 14 is not shown) showing the state of the carriage 13 when the printhead 14 is fixed to it. At this point of time, the joint lever 19 is in the open state, and the joint rubber members 142 (see FIG. 3) and the joint needles 182 are separated from each other (decoupled state).

The user holds a portion near the lock member 196 and causes the joint lever 19 to pivot in the first direction 19*a* (FIG. 6B). With this operation, the joint positioning pins 181 are inserted into the head positioning holes 141 of the printhead 14, and the joint needles 182 shift to the coupled state with the ink inflow portions 146 (the joint rubber members 142) of the printhead 14. At this time, a second force 19*d* in the +Y direction acts on the joint needle 182 owing to the elastic force of the joint rubber member 142 to cause the joint lever 19 to try to open to a second direction 19*b* opposite in the first direction 19*a*. This causes a problem that the insertion amount of the joint needle 182 into the joint rubber member 142 changes.

Figure 9:
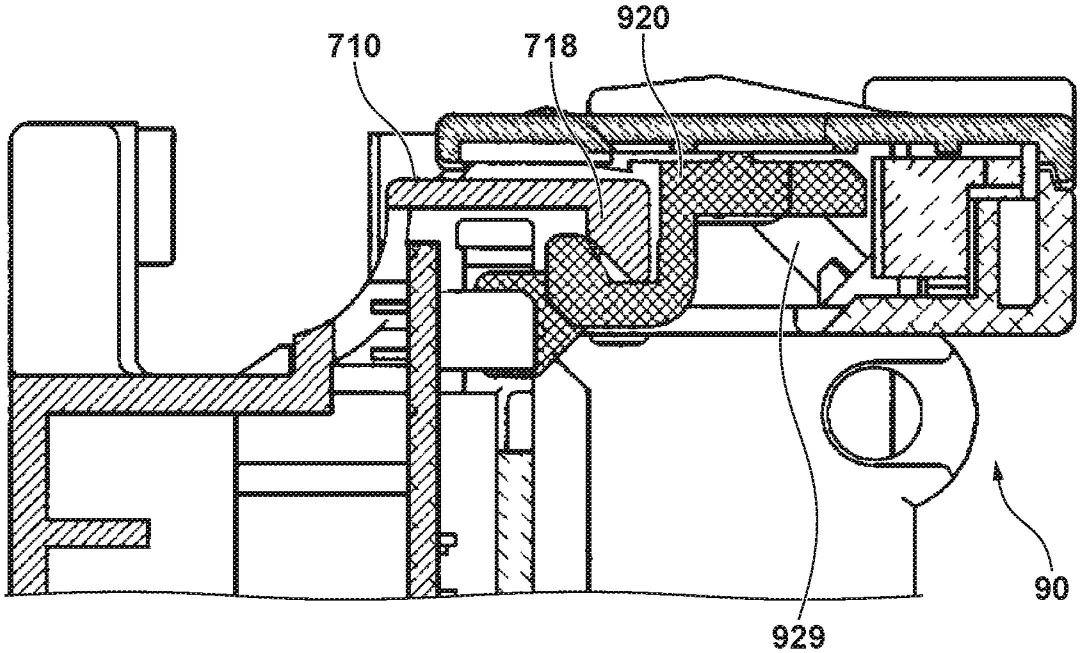
FIG. 9 is a side sectional view showing the arrangement of a conventional joint lever.

In consideration of this problem, as shown in FIG. 9, the conventional technique is designed to reduce the variation in joint insertion amount by engaging a lever engaging member 920 attached to a needle insertion/removal lever 90 with a hook portion 718 formed on a carriage 710. However, a biasing spring 929 is required to maintain the engaged state of the lever engaging member 920 with respect to the carriage 710, resulting in increases in the number of components and the size of the apparatus.

In order to solve this problem, in this embodiment, the joint lever 19 is fixed to the carriage 13 by engaging the lock member 196 with the engaging face 135 of the head set lever 131.

FIG. 6C is a sectional view showing a lock state in which the lock member 196 is engaged with the engaging face 135. When the joint lever 19 receives the second force 19*d*, the joint lever 19 tries to open in the second direction 19*b*. At this time, the lock member 196 receives a force 19*g* in an opposite direction to the second force 19*d* from the engaging face 135 to bias the joint lever 19 in the first direction 19*a*. The detailed relationship between the acting forces in the lock state will be described with reference to FIG. 7.

Figure 7:
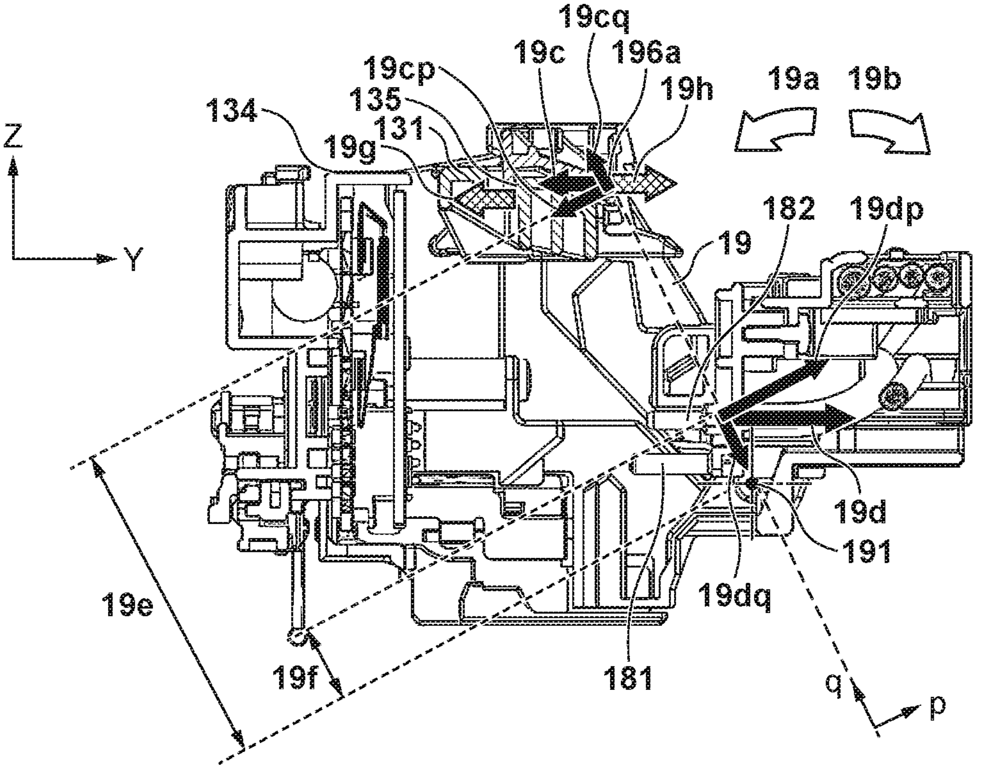
FIG. 7 is a view showing forces acting on the joint lever in a lock state.

FIG. 7 is a sectional view showing the acting forces on the joint lever 19 in the lock state. In the lock state, the joint lever 19 receives the second force 19*d* from the joint rubber member 142 and receives a first force (lock force) 19*c* from the lock member 196. When the forces 19*d* and 19*c* each are decomposed in a direction q defined by a line connecting the action point to the joint lever rotation center 191 and a direction p perpendicular to the direction q, the second force 19*d* is decomposed into a force 19*dp* and a force 19*dq*, and the first force 19*c* is decomposed into a force 19*cp* and a force 19*cq*. Attention is given here to the moment about the joint lever rotation center 191 which acts on the joint lever 19. At this time, the component force 19*dp* of the second force 19*d* generates a moment that rotates the joint lever in the second direction 19*b*, and the component force 19*cp* of the first force 19*c* generates a moment that rotates the joint lever in the first direction 19*a*. The rotation moment due to the component force 19*dp* balances the rotation moment due to the component force 19*cp*. The lock member 196 receives a counteracting force 19*h* of the first force 19*c* from the joint lever 19 and receives the force 19*g* from the engaging face 135 of the carriage 13. The forces 19*h* and 19*g* acting on the lock member 196 balance each other.

That is, in the lock state, as the forces received by the joint lever 19 and the lock member 196 balance each other, the second force 19*d* received from the joint rubber members 142 has a correlation with the force 19*g* received by the lock member 196 from the engaging face 135. For example, as the second force 19*d* increases, the first force 19*c* increases, and the counteracting force 19*h* of the first force 19*c* and the holding force 19*g* of the lock member increase. This makes it possible to stabilize the insertion amount of the joint portion 18 into the printhead 14 regardless of the magnitude of the elastic force of the joint rubber members 142. This enables the printhead 14 to stably discharge ink while preventing air leakage in the joint portion 18. In addition, this embodiment does not newly require a spring part for providing a force for fixing the joint lever 19, and hence enables reductions in the cost and size of the overall apparatus.

In a disengaged state in which the lock member 196 is disengaged from the engaging face 135, the joint lever 19 permits a shift from the coupled state between the ink inflow portions 146 and the joint needles 182 to the decoupled state.

In addition, in this embodiment, a first distance 19*e* from the joint lever rotation center 191 of the joint lever to the action point of the first force 19*c* received by the joint lever is longer than a second distance 19*f* from the joint lever rotation center 191 of the joint lever 19 to the action point of the second force 19*d* received by the joint lever. This arrangement makes the first force 19*c* smaller than the second force 19*d* in the lock state. This makes it possible to reduce the force acting on the mounting portion of the lock member 196 of the joint lever 19 or the lock member 196 itself with respect to the elastic forces of the joint rubber members 142. This can reduce the amount of dimensional change due to the creep of a component and allows the component to have a small and inexpensive configuration.

In addition, in this embodiment, the lock member 196 is engaged with the head set lever 131. Accordingly, it is possible to form the joint lever 19 into a configuration shorter than the conventional configuration and reduce the area required for insertion/removal of the joint portion 18. This makes it possible to miniaturize the carriage 13 and the overall apparatus accordingly.

In this embodiment, the engaging face 135 of the head set lever 131 is nearly coaxially arranged on a rotation center axis 131*b* (see FIG. 5B) with respect to the carriage 13 of the head set lever 131. This enables the head set lever 131 to maintain the fixed state of the printhead 14 with respect to the carriage 13 without giving any rotational force to the head set lever 131 even if a force acts on the head set lever 131 in the lock state of the joint lever 19.

In the above embodiment, the lock member 196 is attached to the joint lever 19 so as to be rotatable about the central rotation axis 196*a*. However, the joint lever 19 may be formed from an elastic resin, and the lock member 196 may be integrally formed with the joint lever 19.

Second Embodiment

Figure 8:
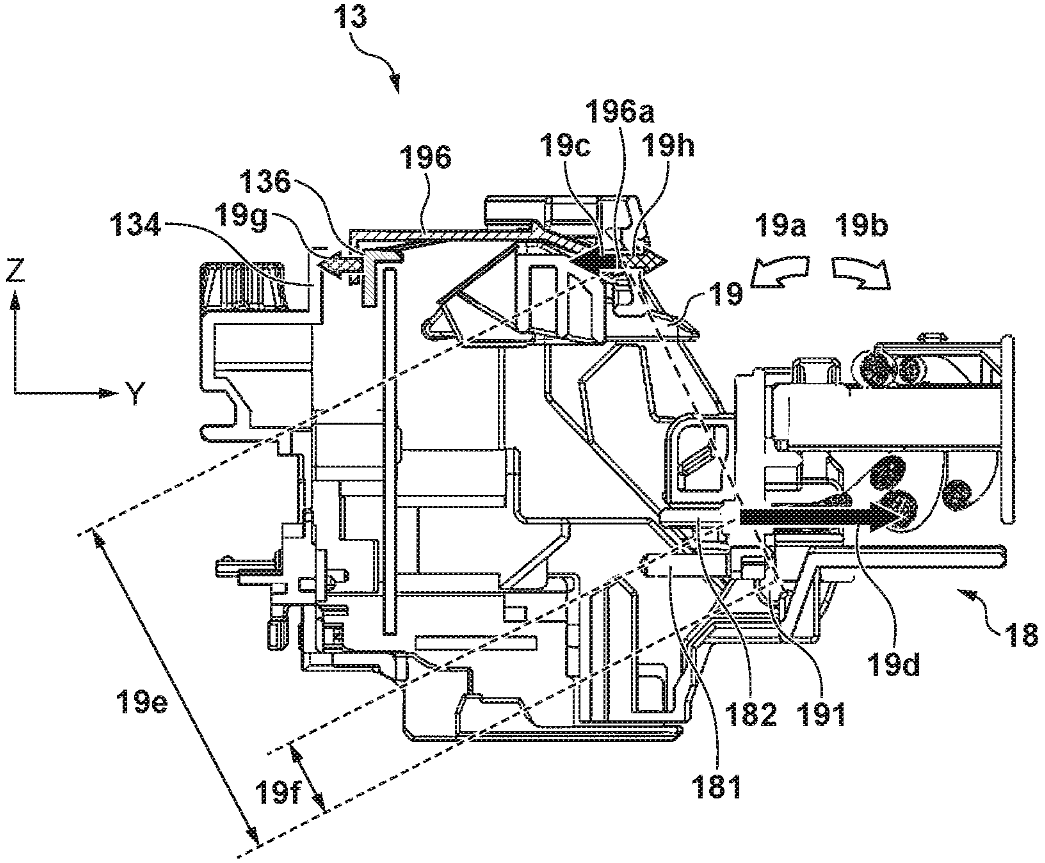
FIG. 8 is a side sectional view showing the lock state of a head set lever and a joint lever according to the second embodiment.

FIG. 8 is a side sectional view showing the lock state between a head set lever 131 and a joint lever 19 according to the second embodiment of the present invention. The structure shown in FIG. 8 is almost the same as that shown in FIG. 7 showing the first embodiment, and hence only differences will be described.

In this embodiment, the joint lever 19 is engaged with an engaging face 136 of a carriage base 134 of a carriage 13. In the embodiment as well, the elastic force of a joint rubber member 142 may cause variation in the insertion amount of a joint 18. In this case as well, the joint lever 19 can obtain a similar effect from a lock member 196. That is, when the joint lever 19 receives a second force 19*d*, the joint lever 19 tries to open in a second direction 19*b*. At this time, however, the lock member 196 receives a force 19*g* from the engaging face 136 of the carriage base 134 and receives a force 19*h* from the joint lever 19.

With this arrangement, the same actions as those in the first embodiment occur, so that the second force 19*d* due to the elastic force of the joint rubber member 142 cancels out a first force 19*c* due to the restricting force of the lock member 196 of the joint lever 19. In this embodiment as well, this enables the joint lever 19 to stabilize the insertion amount of the joint portion 18. Accordingly, the embodiment can obtain the same effects as those of the first embodiment.

In contrast to the arrangement of this embodiment, in the first embodiment, the lock member 196 is engaged with the head set lever 131. In this case, there is a possibility that the engaging face 135 cannot be arranged near the rotation center axis of the head set lever 131. In this case, the counteracting force of the holding force 19*g* of the lock member biases in a direction in which the head set lever 131 opens, and the fixed state of the printhead 14 with respect to the carriage 13 may not be maintained.

In this embodiment, since the lock member 196 is engaged with the carriage base 134, the lock member 196 does not apply any force to the head set lever 131. Accordingly, it is possible to stabilize the insertion amount of the joint portion 18 without varying the fixed position of the printhead 14.

According to the present invention, it is possible to reliably connect a printhead to a liquid supply portion and implement stable discharging from the printhead.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus comprising:

a carriage on which a printhead configured to discharge a liquid is detachably mounted;

a liquid supply portion coupled to a liquid inflow portion of the printhead and configured to supply a liquid to the printhead;

an elastic member arranged on a coupling portion between the liquid inflow portion and the liquid supply portion and configured to seal coupling between the liquid inflow portion and the liquid supply portion;

a first operating member rotatably attached to the carriage and configured to shift the liquid inflow portion and the liquid supply portion to a coupled state in which the liquid inflow portion and the liquid supply portion are coupled by being operated in a first direction and to shift the liquid inflow portion and the liquid supply portion to a decoupled state in which the liquid inflow portion and the liquid supply portion are separated from each other by being operated in a second direction; and a lock member formed by a member different from the first operating member and coupled to the first operating member and configured to switch to a lock state in which the lock member is engaged with an engaging portion of the carriage to restrict the first operating member from shifting from the coupled state to the decoupled state and to a disengaged state in which the lock member is separated from the engaging portion to permit the first operating member to shift from the coupled state to the decoupled state, wherein the carriage includes a base portion on which the printhead is mounted and a second operating member, rotatably supported by the carriage, configured to fix the printhead mounted on the base portion to the carriage, and the lock member is engaged with the carriage via the second operating member, and wherein the first operating member receives, in the lock state, a force that is received from the elastic member and rotates the first operating member in the second direction and a force that is received from the engaging portion and rotates the first operating member in the first direction.

2. The printing apparatus according to claim 1, wherein the lock member is attached to the first operating member so as to be rotatable about a central axis.

3. The printing apparatus according to claim 2, wherein the lock member is switched to the lock state and the disengaged state by being rotated about the central axis with respect to the first operating member.

4. The printing apparatus according to claim 1, wherein a distance from a position of a first rotation center with respect to the carriage of the first operating member to a position at which a force for rotation in the second direction by the elastic member is received is smaller than a distance from the position of the first rotation center to a position at which a force for rotation in the first direction acts.

5. The printing apparatus according to claim 1, wherein the second operating member is attached to the base portion so as to be rotatable about a second rotation center, and the lock member is engaged with the second operating member substantially at a position of the second rotation center in the lock state.

6. The printing apparatus according to claim 1, wherein the carriage has the printhead detachably mounted on the carriage.

7. The printing apparatus according to claim 1, wherein the elastic member is arranged on at least one of the liquid inflow portion and the liquid supply portion.

8. The printing apparatus according to claim 1, wherein the liquid supply portion is a needle inserted into the elastic member arranged on the liquid inflow portion.

9. The printing apparatus according to claim 1, further comprising:

a storage body configured to store a liquid supplied to the printhead; and a supply path configured to supply a liquid from the storage body to the printhead, wherein the liquid supply portion forms a joint portion configured to connect the printhead to the supply path.

* * * * *